(12) United States Patent
Ishii et al.

(10) Patent No.: US 12,169,707 B2
(45) Date of Patent: Dec. 17, 2024

(54) COMPUTER SYSTEM, DEPLOYMENT PLAN GENERATION METHOD, AND DEPLOYMENT CONTROL SYSTEM

(71) Applicant: Hitachi, Ltd., Tokyo (JP)

(72) Inventors: Yohsuke Ishii, Tokyo (JP); Masayuki Sakata, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 91 days.

(21) Appl. No.: 18/119,035

(22) Filed: Mar. 8, 2023

(65) Prior Publication Data

US 2024/0069887 A1  Feb. 29, 2024

(30) Foreign Application Priority Data

Aug. 29, 2022  (JP) ................................. 2022-135826

(51) Int. Cl.
  *G06F 8/65*  (2018.01)
(52) U.S. Cl.
  CPC ..................... *G06F 8/65* (2013.01)
(58) Field of Classification Search
  None
  See application file for complete search history.

(56) References Cited

U.S. PATENT DOCUMENTS

| | | | |
|---|---|---|---|
| 10,990,370 B1* | 4/2021 | Bawcom | H04L 41/0895 |
| 11,372,634 B1* | 6/2022 | Gabrielson | H04L 67/1031 |
| 2005/0160104 A1* | 7/2005 | Meera | G06F 8/36 |
| 2021/0132947 A1* | 5/2021 | John | G06N 20/00 |

OTHER PUBLICATIONS

Georgievski, "Cloud Ready Applications Composed via HTN Planning", 2017, IEEE (Year: 2017).*

* cited by examiner

*Primary Examiner* — Hossain M Morshed
(74) *Attorney, Agent, or Firm* — Foley & Lardner LLP

(57) ABSTRACT

A computer system is coupled to infrastructure systems each configured to implement an environment for providing resources to each of instances forming an application. The computer system is configured to: receive a deployment plan generation request for the application which includes a serverless instance for which, as an activation method, any one of a warm start and a cold start is selectable; generate, based on a resource amount required for the each of instances, an allocation pattern which is a combination of an environment of a deployment destination of the each of instances; generate an activation pattern which is a combination of the activation method for the each of instances; plan an activation timing of the serverless instance for the activation pattern; generate a plurality of deployment plans by combining the allocation pattern, the activation pattern, and the activation timing.

9 Claims, 19 Drawing Sheets

*FIG. 3*

| INFRASTRUCTURE SYSTEM ID | CLUSTER ID | CPU INFORMATION | | | MEMORY INFORMATION | | TIMESTAMP |
|---|---|---|---|---|---|---|---|
| | | SPECIFICATION | TOTAL AMOUNT | UNALLOCATED AMOUNT | SPECIFICATION | ... | |
| Sys01 | C01 | 1.5GHz | 100vcpu | 80vcpu | DDR3 | ... | 20220422 00:00:10 |
| ... | ... | ... | ... | ... | ... | ... | ... |

| APPLICATION ID | INSTANCE ID | INSTANCE TYPE | CPU INFORMATION | | MEMORY INFORMATION | | TIMESTAMP |
|---|---|---|---|---|---|---|---|
| | | | ALLOCATED VALUE | MINIMUM USAGE RATE | MAXIMUM USAGE AMOUNT | | |
| App01 | inst01 | function | 1vcpu | 0% | 100MB | ... | 20220422 00:00:10 |
| ... | ... | ... | ... | ... | ... | ... | ... |

*FIG. 4*

| APPLICATION ID | INSTANCE ID | INSTANCE TYPE | ENVIRONMENT | RESOURCE | | ... | ACTIVATION TYPE | ACTIVATION TIME | TIMESTAMP |
| | | | | CPU | MEMORY | | | | |
| --- | --- | --- | --- | --- | --- | --- | --- | --- | --- |
| App01 | inst01 | function | Sys01; C01 | 1vcpu | 2GB | ... | COLD START | 4.5sec | 20220422 00:00:10 |
| ... | ... | ... | ... | ... | ... | ... | ... | ... | ... |

FIG. 5

| APPLICATION ID | INSTANCE ID | INSTANCE TYPE | MODEL | | | TIMESTAMP |
|---|---|---|---|---|---|---|
| | | | CPU | MEMORY | ... | |
| App01 | inst01 | function | Y=a1*X+b1 | Y=p1*X+q1 | ... | 20220425 02:00:35 |
| ... | ... | ... | ... | ... | ... | ... |

*FIG. 6*

| APPLICATION ID | INSTANCE ID | INSTANCE TYPE | MODEL | | TIMESTAMP |
|---|---|---|---|---|---|
| | | | COLD START | WARM START | |
| App01 | inst01 | function | Y=r1*X+s1 | Y=0 | 20220425 02:10:15 |
| ... | ... | ... | ... | ... | ... |

*FIG. 7*

| 801 | 802 | 803 | 800 |
|---|---|---|---|
| INSTANCE ID | INSTANCE TYPE | RESOURCE AMOUNT | |
| inst01 | function | 1vCPU 2GBmem | |
| ⋮ | ⋮ | ⋮ | |

FIG. 8A

| ALLOCATION PATTERN ID | INSTANCE | | |
|---|---|---|---|
| | INSTANCE 1 | INSTANCE 2 | INSTANCE 3 |
| AI_1 | Sys01, C01 | Sys03, C01 | Sys04, C02 |
| AI_2 | Sys01, C01 | Sys03, C01 | Sys05, C01 |
| ⋮ | ⋮ | ⋮ | ⋮ |

| ACTIVATION PATTERN ID | INSTANCE | | |
|---|---|---|---|
| | INSTANCE 1 | INSTANCE 2 | INSTANCE 3 |
| B_1 | WARM START | WARM START | WARM START |
| B_2 | WARM START | WARM START | COLD START |
| ⋮ | ⋮ | ⋮ | ⋮ |

| ACTIVATION TIMING ID | ACTIVATION PATTERN ID | ACTIVATION TIMING |
|---|---|---|
| T_1 | B_2 | ACTIVATE TASK 3 WHEN REQUEST FOR TASK 1 IS RECEIVED |
| ⋮ | ⋮ | ⋮ |

| ALLOCATION PATTERN ID 841 | ACTIVATION PATTERN ID 842 | ACTIVATION TIMING ID 843 | PREDICTED PROCESSING TIME 844 | PREDICTED ACTIVATION TIME 845 | PREDICTED COST 846 | PREDICTED POWER CONSUMPTION 847 |
|---|---|---|---|---|---|---|
| AL_1 | B_1 | - | 2sec | 0sec | ¥20/day | 3000Wh |
| AL_1 | B_2 | T_1 | 6sec | inst01; 5sec | ¥12/day | 2000Wh |
| ... | ... | ... | ... | ... | ... | ... |

| SELECTION 1711 | ALLOCATION PATTERN 1712 | ACTIVATION PATTERN 1713 | ACTIVATION TIMING 1714 | PREDICTED PROCESSING TIME 1715 | PREDICTED ACTIVATION TIME 1716 | PREDICTED COST 1717 | PREDICTED POWER CONSUMPTION 1718 |
|---|---|---|---|---|---|---|---|
| ☐ | inst01:Sys01,C01<br>inst02:Sys_3,C01<br>inst03:Sys_4,C02 | inst01: WARM<br>inst02: WARM<br>inst03: WARM | - | 2sec | 0sec | ¥20/day | 3000Wh |
| ☐ | inst01:Sys01,C01<br>inst02:Sys_3,C01<br>inst03:Sys_4,C02 | inst01: WARM<br>inst02: WARM<br>inst03: COLD | xxxxx xxxxx | 6sec | inst03: 5sec | ¥12/day | 2000Wh |
| ... | ... | ... | ... | ... | ... | ... | ... |

[DEPLOY] 1702  [CANCEL] 1703

| | 2001 | 2002 | 2003 | 2000 |
|---|---|---|---|---|
| | APPLICATION ID | INSTANCE ID | ACTIVATION TIMING | |
| | App01 | inst01 | - | |
| | App01 | inst02 | - | |
| | App01 | inst03 | RECEPTION OF inst01 REQUEST | |

| APPLICATION ID 2301 | ALLOCATION PATTERN 2302 | ACTIVATION PATTERN 2303 | ACTIVATION TIMING 2304 | PROCESSING TIME 2305 | COST 2306 | POWER CONSUMPTION 2307 |
|---|---|---|---|---|---|---|
| App01 | inst01:Sys01,C01<br>inst02:Sys_3,C01<br>inst03:Sys_4,C02 | inst01: WARM<br>inst02: WARM<br>inst03: WARM | - | 2sec | ¥20/day | 3000Wh |
| App02 | inst01:Sys01,C01<br>inst02:Sys_3,C01<br>inst03:Sys_4,C02 | inst01: WARM<br>inst02: WARM<br>inst03: COLD | xxxxx xxxxx | 10sec | ¥12/day | 2000Wh |
| ... | ... | ... | ... | ... | ... | ... |

*FIG. 23*

COMPUTER SYSTEM, DEPLOYMENT PLAN GENERATION METHOD, AND DEPLOYMENT CONTROL SYSTEM

CLAIM OF PRIORITY

The present application claims priority from Japanese patent application JP 2022-135826 filed on Aug. 29, 2022, the content of which is hereby incorporated by reference into this application.

BACKGROUND OF THE INVENTION

This invention relates to a technology for planning a deployment plan for an application formed from a plurality of instances.

In order to perform data analysis, for example, the introduction of multi-cloud, which builds an environment by combining a plurality of cloud systems, is progressing. A serverless technology is also attracting attention. In the serverless technology, for example, a function and a trigger are registered in a cloud system, resources required for executing the function are allocated in a case where the trigger is detected, and the function is executed by using the resources. US 2021/0132947 A1 is known as a technology for planning a deployment plan of data, functions, tasks, and the like in multi-cloud.

In US 2021/0132947 A1, it is described that data descriptive of a plurality of tasks included in a serverless workflow is input into a machine-learned model to determine a trigger for task execution and a cloud service provider to execute the task.

SUMMARY OF THE INVENTION

Serverless instances are usually slow to respond because the resources are allocated and activated when the trigger is detected. In the following description, "cold start" refers to allocating and activating resources when a trigger is detected, and "warm start" refers to always allocating and activating resources at the time of deployment.

The response speed and cost, for example, at the time in a case where a serverless instance is activated in a warm start and in a cold start are different. Therefore, the activation method for a serverless instance is an important factor in planning the deployment plan of an application formed from a plurality of instances. In the related-art technology, the deployment plan is not planed in consideration of the activation method for serverless tasks.

This invention implements a technology for planning a deployment plan for an application (workflow) formed from normal instances and serverless instances in consideration of an activation method for the serverless instances.

A representative example of the present invention disclosed in this specification is as follows: a computer system comprises at least one computer, the at least one computer includes a processor, a storage device coupled to the processor, and a network interface coupled to the processor. The computer system is coupled to a plurality of infrastructure systems each configured to implement an environment for providing resources to each of a plurality of instances forming an application which executes processing. The processor is configured to: receive a deployment plan generation request for the application which includes at least one serverless instance for which, as an activation method, any one of a warm start and a cold start is selectable, the warm start being allocating and activating resources at a time of deployment, the cold start being allocating and activating resources when an execution trigger is detected; generate, based on a resource amount required for each of the plurality of instances, an allocation pattern which is a combination of an environment of a deployment destination of each of the plurality of instances; generate an activation pattern which is a combination of the activation method for each of the plurality of instances; plan an activation timing of the at least one serverless instance for the activation pattern; generate a plurality of deployment plans by combining the allocation pattern, the activation pattern, and the activation timing; and generate display information for displaying the plurality of deployment plans.

According to the at least one embodiment of this invention, the computer system can plan and present a deployment plan for an application which considers the activation method for serverless instances. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3 is a table for showing an example of infrastructure system operation management information in the first embodiment;

FIG. 4 is a table for showing an example of instance operation management information in the first embodiment;

FIG. 5 is a table for showing an example of activation time management information 1 in the first embodiment;

FIG. 6 is a table for showing an example of resource amount prediction model information in the first embodiment;

FIG. 7 is a table for showing an example of activation time prediction model information in the first embodiment;

FIG. 8A, FIG. 8B, FIG. 8C, FIG. 8D, and FIG. 8E are tables for showing an example of deployment plan DB in the first embodiment;

FIG. 15, FIG. 16, and FIG. 17 are diagrams for illustrating examples of screens displayed on a client PC in the first embodiment;

FIG. 23 is a table for showing an example of the application operation management information in the second embodiment.

DETAILED DESCRIPTION OF THE PREFERRED EMBODIMENTS

Figure 1:
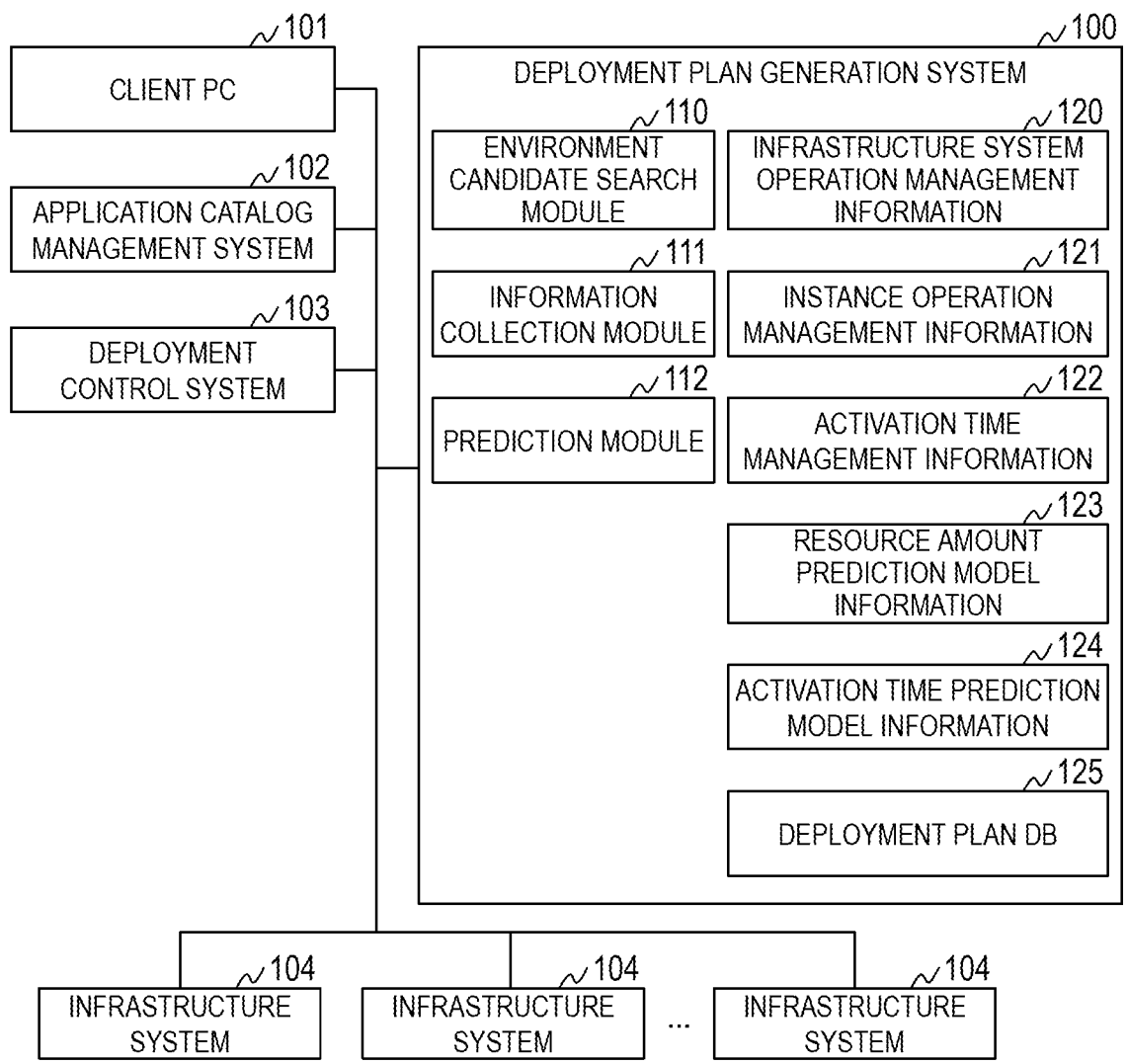
FIG. 1 is a diagram for illustrating an example of a configuration of a system according to a first embodiment of this invention.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first", "second", and "third" herein are assigned to distinguish between components, and do not necessarily limit the number or order of those components.

First Embodiment

Figure 2:
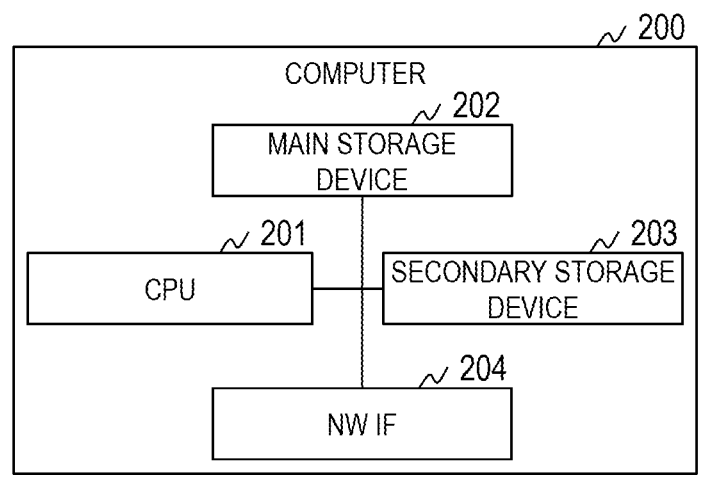
FIG. 2 is a diagram for illustrating an example of a configuration of a computer in the first embodiment.

FIG. 1 is a diagram for illustrating an example of a configuration of a system according to a first embodiment of this invention. FIG. 2 is a diagram for illustrating an example of a configuration of a computer in the first embodiment.

The system according to the first embodiment includes a deployment plan generation system 100, a client PC 101, an application catalog management system 102, a deployment control system 103, and a plurality of infrastructure systems (cloud systems) 104. The deployment plan generation system 100, the client PC 101, the application catalog management system 102, the deployment control system 103, and the plurality of infrastructure systems 104 are coupled to each other through a network such as a local area network (LAN) and a wide area network (WAN). A coupling method of the network may be any one of a wired manner or a wireless manner.

The client PC 101 is a terminal to be operated by a user who uses an application for implementing a predetermined service.

The infrastructure system 104 is a computer system which provides an environment for executing instances forming an application for implementing a predetermined service.

The application catalog management system 102 manages an application catalog being information regarding the applications.

The deployment plan generation system 100 generates a deployment plan for deploying the instances which forms an application. The instances are, for example, functions, containers, and virtual machines.

The deployment control system 103 deploys instances in the environment based on the deployment plan planed by the deployment plan generation system 100 and selected by the user.

The deployment plan generation system 100, the application catalog management system 102, the deployment control system 103, and the infrastructure system 104 are each formed of such a computer 200 as illustrated in, for example, FIG. 2.

The computer 200 includes a CPU 201, a main storage device 202, a secondary storage device 203, and a network interface 204. The respective hardware components are coupled to each other through a bus. The computer 200 may include input devices such as a keyboard, a mouse, and a touch panel, and may include output devices such as a display.

The CPU 201 executes programs stored in the main storage device 202. The CPU 201 functions as a functional module (module) by executing processing in accordance with the programs. In the following description, when processing is described with the functional module as the subject of the sentence, this indicates that the CPU 201 executes a program for implementing the functional module.

The main storage device 202 is a memory, for example, and stores the programs executed by the CPU 201 and the information used by the programs. The main storage device 202 also includes a work area to be temporarily used by the program.

The secondary storage device 203 is, for example, a hard disk drive (HDD) or a solid state drive (SSD), and stores a large amount of data permanently. The programs and information stored in the main storage device 202 may be stored in the secondary storage device 203. In this case, the CPU 201 reads out programs and information from the secondary storage device 203, and loads the read programs and information onto the main storage device 202.

The network interface 204 communicates to and from other devices via the network.

The deployment plan generation system 100 includes an environment candidate search module 110, an information collection module 111, and a prediction module 112. The deployment plan generation system 100 holds infrastructure system operation management information 120, instance operation management information 121, activation time management information 122, resource amount prediction model information 123, activation time prediction model information 124, and a deployment plan DB 125.

The infrastructure system operation management information 120 is information for managing an operating status of the infrastructure system 104. The instance operation management information 121 is information for managing an operating status of an instance. The activation time management information 122 is information for managing an activation time of the instance. The resource amount prediction model information 123 is information for managing a model for predicting a resource amount required for deployment of the instance. The activation time prediction model information 124 is information for managing a model for predicting the activation time of the instance. The deployment plan DB 125 is a database which stores information on deployment plans, including combinations of environments for deploying the instance.

The information collection module 111 collects various types of information. The prediction module 112 uses the resource amount prediction model information 123 to predict the resource amount required to deploy the instance, and uses the activation time prediction model information 124 to predict the activation time of the instance. The environment candidate search module 110 searches for combinations of environments for deploying the instance, and generates a deployment plan.

In regard to the respective functional modules included in the deployment plan generation system 100, a plurality of functional modules may be integrated into one functional module, or one functional module may be divided into a plurality of functional modules. For example, the prediction module 112 may be divided into a functional module for predicting the resource amount and a functional module for predicting the activation time.

FIG. 3 is a table for showing an example of the infrastructure system operation management information 120 in the first embodiment.

The infrastructure system operation management information 120 stores entries each including an infrastructure system ID 301, a cluster ID 302, CPU information 303, memory information 304, and a timestamp 305. There is one entry for each environment. The fields included in the entry are not limited to those described above. Any one of the fields described above may be excluded, or another field may be included.

The infrastructure system ID 301 is a field which stores an ID of the infrastructure system 104. The cluster ID 302 is a field which stores an ID of a cluster forming the environment. One or more clusters are included in the infrastructure system 104, and one environment is implemented through use of one cluster.

The CPU information 303 is a group of fields which store information on the CPU that the cluster has. The CPU information 303 includes fields such as a specification, a total amount, and an unallocated amount. The memory information 304 is a group of fields which store information on a memory that the cluster has. The memory information 304 includes fields such as a specification, a total amount, and an unallocated amount. The entry may also include a field relating to a network bandwidth, for example.

The timestamp 305 is a field which stores the date and time at which the information corresponding to the entry is obtained.

FIG. 4 is a table for showing an example of the instance operation management information 121 in the first embodiment.

The instance operation management information 121 stores entries each including an application ID 401, an instance ID 402, an instance type 403, CPU information 404, memory information 405, and a timestamp 406. There is one entry for each instance. The fields included in the entry are not limited to those described above. Any one of the fields described above may be excluded, or another field may be included.

The application ID 401 is a field which stores an ID of the application. The instance ID 402 is a field which stores an ID of the instance forming the application. The instance type 403 is a field which stores the type of the instance. For example, the instance type 403 stores functions, containers, and virtual machines.

In the first embodiment, the activation method is determined in accordance with the type of the instance. For a serverless instance, for example, a function, any one of a cold start and a warm start can be selected. Warm start refers to allocating and activating the resources at the time of deployment. Cold start refers to allocating the resources to the instance, but the resources are activated when a request is received, and not at the time of deployment.

The CPU information 404 is a group of fields which store information on a usage amount of the CPU of the instance. The CPU information 404 includes fields such as an allocated value, a minimum usage rate, a maximum usage rate, and an average usage rate. The memory information 405 is a group of fields which store information on a memory usage amount of the instance. The memory information 405 includes fields such as an allocated amount, a minimum usage amount, a maximum usage amount, and an average usage amount. The entry may also include a field relating to a network bandwidth, for example.

The timestamp 406 is a field which stores the date and time at which the information corresponding to the entry is obtained.

FIG. 5 is a table for showing an example of the activation time management information 122 in the first embodiment.

The activation time management information 122 stores entries each including an application ID 501, an instance ID 502, an instance type 503, an environment 504, resources 505, an activation type 506, an activation time 507, and a timestamp 508. There is one entry for each instance. The fields included in the entry are not limited to those described above. Any one of the fields described above may be excluded, or another field may be included.

The application ID 501, the instance ID 502, and the instance type 503 are the same fields as those of the application ID 401, the instance ID 402, and the instance type 403, respectively.

The environment 504 is a field which stores the ID of the infrastructure system 104 and the cluster in which the instance is deployed. The resources 505 are a group of fields which store information on the resources allocated to the instance. In the resources 505, fields such as CPU and memory are included.

The activation type 506 is a field which stores the activation type of the instance. In the activation type 506, any one of warm start or cold start is stored. The activation time 507 is a field which stores the period of time (activation time) from reception of the request until the instance becomes ready for processing.

The timestamp 508 is a field which stores the date and time at which the activation time is measured.

FIG. 6 is a table for showing an example of the resource amount prediction model information 123 in the first embodiment.

The resource amount prediction model information 123 stores entries each including an application ID 601, an instance ID 602, an instance type 603, a model 604, and a timestamp 605. There is one entry for each instance. The fields included in the entry are not limited to those described above. Any one of the fields described above may be excluded, or another field may be included.

The application ID 601, the instance ID 602, and the instance type 603 are the same fields as those of the application ID 401, the instance ID 402, and the instance type 403, respectively.

The model 604 is a group of fields which store a model for predicting the resource amount of each resource. The model 604 includes fields for storing a model for predicting the resource amount of, for example, the CPU and the memory.

The timestamp 605 is a field which stores the date and time at which the model is registered.

FIG. 7 is a table for showing an example of the activation time prediction model information 124 in the first embodiment.

The activation time prediction model information 124 stores entries each including an application ID 701, an instance ID 702, an instance type 703, a model 704, and a timestamp 705. There is one entry for each instance. The fields included in the entry are not limited to those described above. Any one of the fields described above may be excluded, or another field may be included.

The application ID 701, the instance ID 702, and the instance type 703 are the same fields as those of the application ID 401, the instance ID 402, and the instance type 403, respectively.

The model 704 is a group of fields which store a model for predicting the activation time for each activation type of instance. In the model 704, a model for predicting a cold-start activation time and a model for predicting a warm-start activation time are stored.

The timestamp 705 is a field which stores the date and time at which the model is registered.

FIG. 8A, FIG. 8B, FIG. 8C, FIG. 8D, and FIG. 8E are tables for showing an example of the deployment plan DB 125 in the first embodiment.

The deployment plan DB 125 includes predicted resource amount information 800, allocation pattern information 810, activation pattern information 820, activation timing information 830, and deployment plan management information 840.

The predicted resource amount information 800 shown in FIG. 8A is information for managing a predicted value of the resource amount required for the instance. The predicted resource amount information 800 stores entries each including an instance ID 801, an instance type 802, and a resource amount 803. There is one entry for each instance. The fields included in the entry are not limited to those described above. Any one of the fields described above may be excluded, or another field may be included.

The instance ID 801 and instance type 802 are the same fields as those of the instance ID 402 and the instance type 403, respectively.

The resource amount 803 is a field which stores the predicted value of the resource amount required for the instance. In the resource amount 803, the predicted values of the resource amounts of, for example, the CPU and the memory, are stored.

The allocation pattern information 810 shown in FIG. 8B is information for managing an allocation pattern which indicates a combination of deployment destination environments for each instance forming an application. The allocation pattern information 810 stores entries each including an allocation pattern ID 811 and an instance 812. There is one entry for each allocation pattern. The fields included in the entry are not limited to those described above. Any one of the fields described above may be excluded, or another field may be included.

The allocation pattern ID 811 is a field which stores the ID of the allocation pattern. The instance 812 is a group of fields which store information on the deployment destination environment of each instance forming the application. The instance 812 has as many fields as the number of instances forming the application. Each field stores a combination of the ID of the infrastructure system 104 and the ID of the cluster.

The activation pattern information 820 shown in FIG. 8C is information for managing an activation pattern which indicates a combination of activation types for each instance forming an application. The activation pattern information 820 stores entries each including an activation pattern ID 821 and an instance 822. There is one entry for each activation pattern. The fields included in the entry are not limited to those described above. Any one of the fields described above may be excluded, or another field may be included.

The activation pattern ID 821 is a field which stores the ID of the activation pattern. The instance 822 is a group of fields which store an activation type of each instance forming the application. The instance 822 has as many fields as the number of instances forming the application. In the field, any one of warm start and cold start is stored.

The activation timing information 830 shown in FIG. 8D is information for managing the activation timing of the instance for the activation pattern. The activation timing information 830 stores entries each including an activation timing ID 831, an activation pattern ID 832, and an activation timing 833. There is one entry for each activation timing. The fields included in the entry are not limited to those described above. Any one of the fields described above may be excluded, or another field may be included.

The activation timing ID 831 is a field which stores the ID of the activation timing. The activation pattern ID 832 is a field which stores the ID of the activation pattern to be set at the activation timing. The activation timing 833 is a field which stores the activation timing of the instance for the activation pattern.

The deployment plan management information 840 shown in FIG. 8E is information for managing the deployment plan for deploying the instances that form the application. The deployment plan management information 840 stores entries each including an allocation pattern ID 841, an activation pattern ID 842, an activation timing ID 843, a predicted processing time 844, a predicted activation time 845, a predicted cost 846, and a predicted power consumption 847. There is one entry for each deployment plan. The fields included in the entry are not limited to those described above. Any one of the fields described above may be excluded, or another field may be included.

In the first embodiment, the deployment plan is defined by a combination of the allocation pattern, the activation pattern, and the activation timing.

The allocation pattern ID 841, the activation pattern ID 842, and the activation timing ID 843 are the same fields as those of the allocation pattern ID 811, the activation pattern ID 821, and the activation timing ID 831, respectively.

The predicted processing time 844 is a field which stores a predicted value of the processing time of the application in a case where the instance is deployed based on the deployment plan. The predicted activation time 845 is a field which stores a predicted value of the activation time of the instance in a cold start in a case where the instance is deployed based on the deployment plan. The predicted cost 846 is a field which stores a predicted value of the cost required to operate the application in a case where the instance is deployed based on the deployment plan. The predicted power consumption 847 is a field which stores a predicted value of power consumption due to operation of the application in a case where the instance is deployed based on the deployment plan.

The predicted processing time 844, the predicted activation time 845, the predicted cost 846, and the predicted power consumption 847 are performance indices of the deployment plan.

Figure 9:
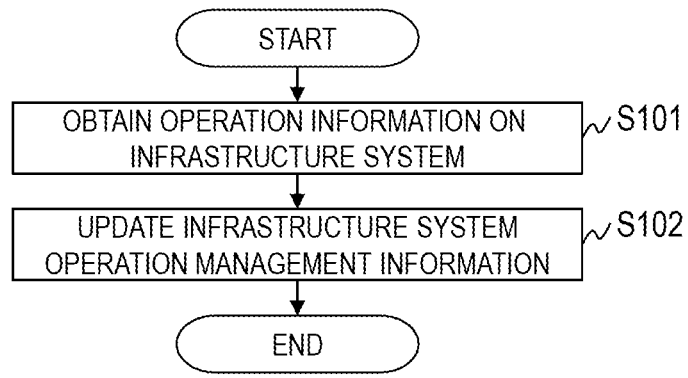
FIG. 9 is a flowchart for illustrating an example of update processing for the infrastructure system operation management information to be executed by a deployment plan generation system of the first embodiment.

FIG. 9 is a flowchart for illustrating an example of update processing for the infrastructure system operation management information 120 to be executed by the deployment plan generation system 100 of the first embodiment.

The information collection module 111 obtains, from the infrastructure system 104, operation information on the infrastructure system 104 (Step S101). For example, the information collection module 111 obtains, from the infrastructure system 104, the operation information on the infrastructure system 104 by transmitting an acquisition request. Further, the infrastructure system 104 may periodically transmit the operation information on the infrastructure system 104.

The operation information on the infrastructure system 104 includes, for example, the ID of the infrastructure system 104, the ID of the cluster, and the resource information.

The information collection module 111 updates the infrastructure system operation management information 120 based on the obtained operation information on the infrastructure system 104 (Step S102). In a case where the infrastructure system operation management information 120 does not include an entry for the infrastructure system 104 for which the operation information has been obtained, the information collection module 111 adds an entry to the infrastructure system operation management information 120, and sets the values included in the operation information in the added entry. In a case where the infrastructure system operation management information 120 includes an entry for the infrastructure system 104 for which the operation information has been obtained, the information collection module 111 overwrites the entry with the values included in the operation information.

Figure 10:
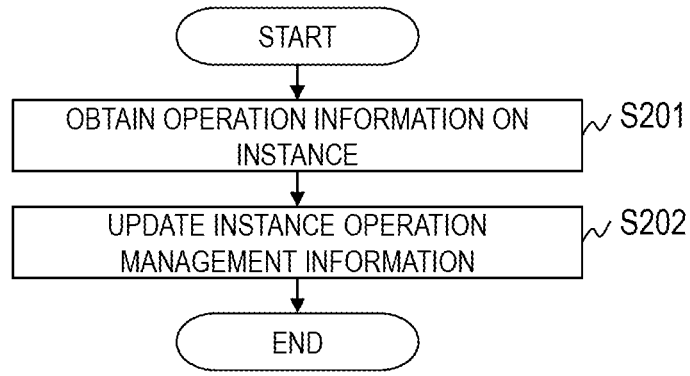
FIG. 10 is a flowchart for illustrating an example of update processing for the instance operation management information to be executed by the deployment plan generation system of the first embodiment.

FIG. 10 is a flowchart for illustrating an example of update processing for the instance operation management information 121 to be executed by the deployment plan generation system 100 of the first embodiment.

The information collection module 111 obtains, from the infrastructure system 104, operation information on the instance (Step S201). For example, the information collection module 111 obtains, from the infrastructure system 104, the operation information on the instance deployed in the environment provided by the infrastructure system 104 by transmitting an acquisition request. Further, the infrastructure system 104 may periodically transmit the operation information on the instance. Further, the infrastructure system 104 may transmit the operation information in a case where processing is executed by the instance.

The operation information on the instance includes, for example, the ID of the infrastructure system 104, the ID of the cluster, the ID of the application, the ID and type of the instance, and information on a resource usage amount.

The information collection module 111 updates the instance operation management information 121 based on the obtained operation information on the instance (Step S202). In a case where the instance operation management information 121 does not include an entry for the instance for which the operation information has been obtained, the information collection module 111 adds an entry to the instance operation management information 121, and sets the values included in the operation information in the added entry. In a case where the instance operation management information 121 includes an entry for the instance for which the operation information has been obtained, the information collection module 111 overwrites the entry with the values included in the operation information.

Figure 11:
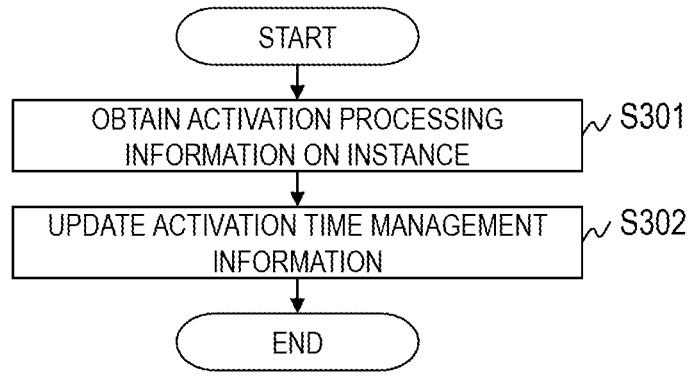
FIG. 11 is a flowchart for illustrating an example of update processing for the activation time management information to be executed by the deployment plan generation system of the first embodiment.

FIG. 11 is a flowchart for illustrating an example of update processing for the activation time management information 122 to be executed by the deployment plan generation system 100 of the first embodiment.

The information collection module 111 obtains, from the infrastructure system 104, activation processing information on the instance (Step S301). For example, in a case where activation processing for the instance has been executed by the infrastructure system 104, the infrastructure system 104 transmits the activation processing information on the instance.

The activation processing information includes, for example, the ID of the application, the ID and type of the instance, the ID of the infrastructure system 104, the ID of the environment, the resource amount allocated to the instance, the activation type, and the activation time.

The information collection module 111 updates the activation time management information 122 based on the obtained activation processing information on the instance (Step S302). In a case where the activation time management information 122 does not include an entry for the instance for which the activation processing information has been obtained, the information collection module 111 adds an entry to the activation time management information 122, and sets the values included in the activation processing information in the added entry. In a case where the activation time management information 122 includes an entry for the instance for which the activation processing information has been obtained, the information collection module 111 overwrites the entry with the value included in the activation processing information.

Figure 12:
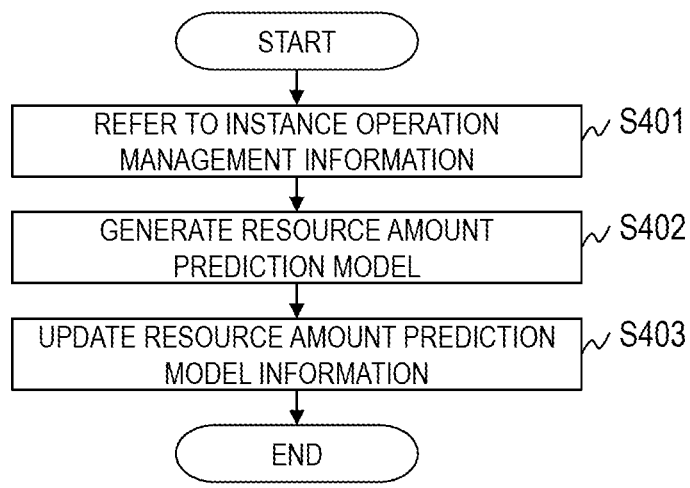
FIG. 12 is a flowchart for illustrating an example of update processing for the resource amount prediction model information to be executed by the deployment plan generation system of the first embodiment.

FIG. 12 is a flowchart for illustrating an example of update processing for the resource amount prediction model information 123 to be executed by the deployment plan generation system 100 of the first embodiment.

The prediction module 112 refers to the instance operation management information 121 (Step S401), and uses the information on the resource allocation amount of the instance to generate a resource amount prediction model for each resource (Step S402). For example, the model is generated through use of multivariate analysis, machine learning, or the like. The model generation method used in this invention is not limited.

The prediction module 112 updates the resource amount prediction model information 123 based on the generation result of the resource amount prediction model (Step S403). In a case where the resource amount prediction model information 123 does not include an entry for the instance, the prediction module 112 adds an entry to the resource amount prediction model information 123, and sets an ID and a resource amount prediction model, for example, in the entry. In a case where the resource amount prediction model information 123 includes an entry for the instance, the prediction module 112 overwrites the model 604 of the entry with the generated resource amount prediction model.

Figure 13:
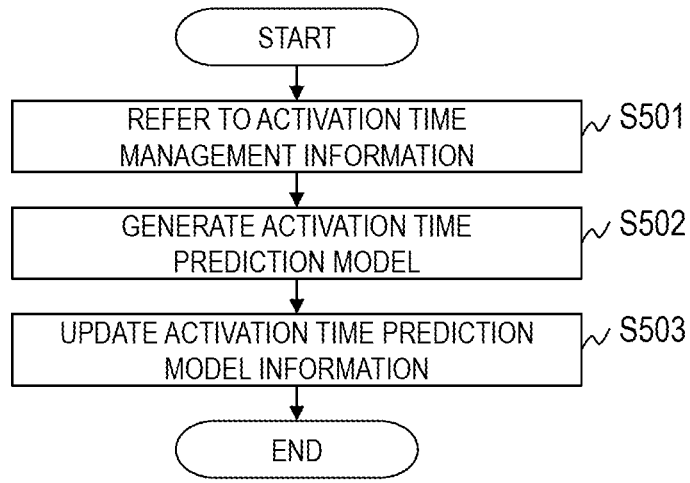
FIG. 13 is a flowchart for illustrating an example of update processing for the activation time prediction model information to be executed by the deployment plan generation system of the first embodiment.

FIG. 13 is a flowchart for illustrating an example of update processing for the activation time prediction model information 124 to be executed by the deployment plan generation system 100 of the first embodiment.

The prediction module 112 refers to the activation time management information 122 (Step S501), and uses the information on the activation time of the instance to generate an activation time prediction model for the instance (Step S502). For example, the model is generated through use of multivariate analysis, machine learning, or the like. The model generation method used in this invention is not limited.

The prediction module 112 updates the activation time prediction model information 124 based on the generation result of the activation time prediction model (Step S503). In a case where the activation time prediction model information 124 does not include an entry for the instance, the prediction module 112 adds an entry to the activation time prediction model information 124, and sets an ID and an activation time prediction model, for example, in the entry. In a case where the activation time prediction model information 124 includes an entry for the instance, the prediction module 112 overwrites the model 704 of the entry with the generated activation time prediction model.

Figure 14A:
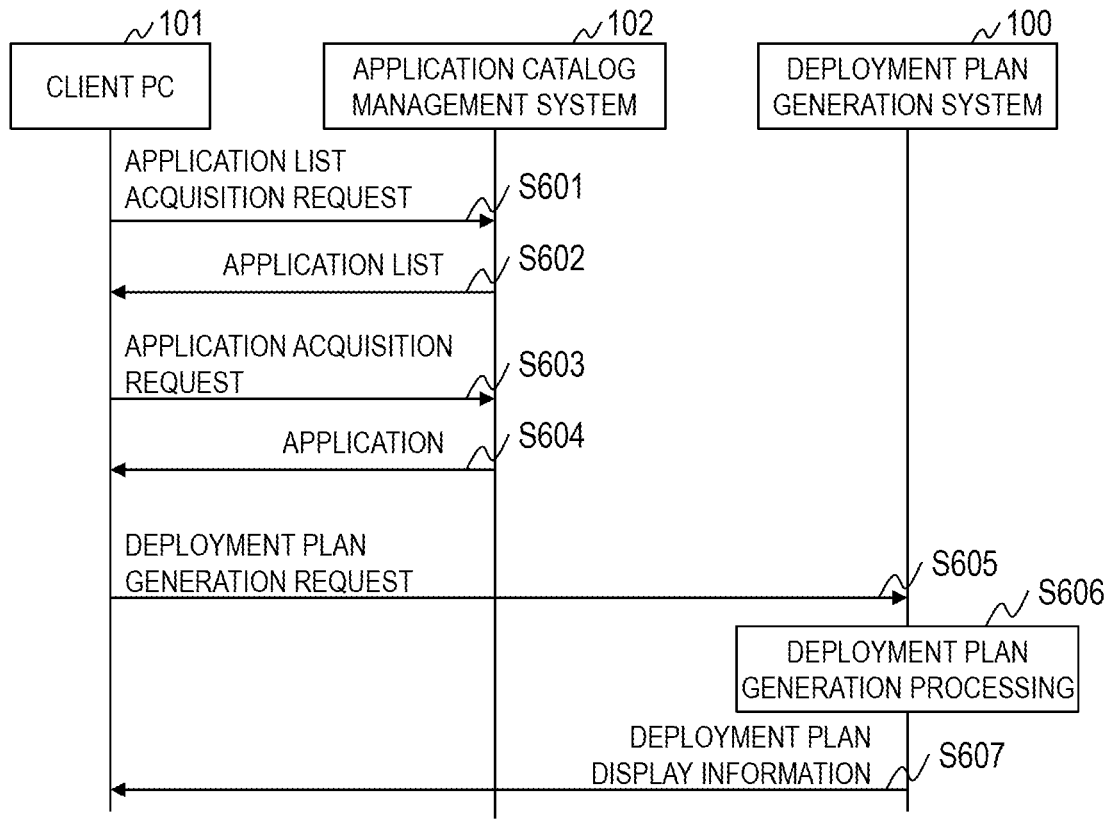
FIG. 14A and FIG. 14B are sequence diagrams for illustrating a flow of deployment processing for an application in the system of the first embodiment.
Figure 14B:
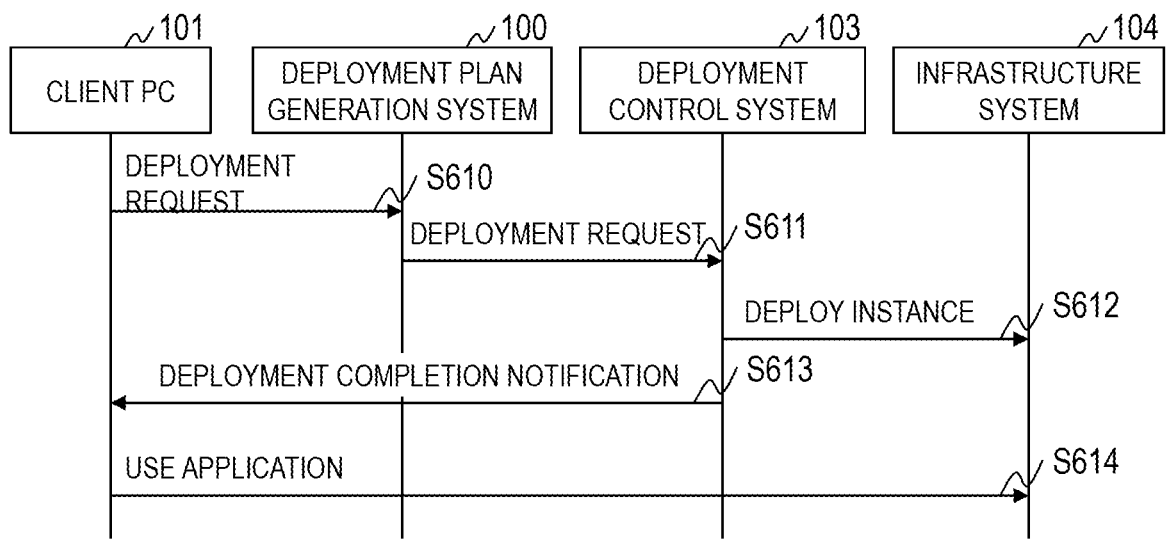
Figure 15:
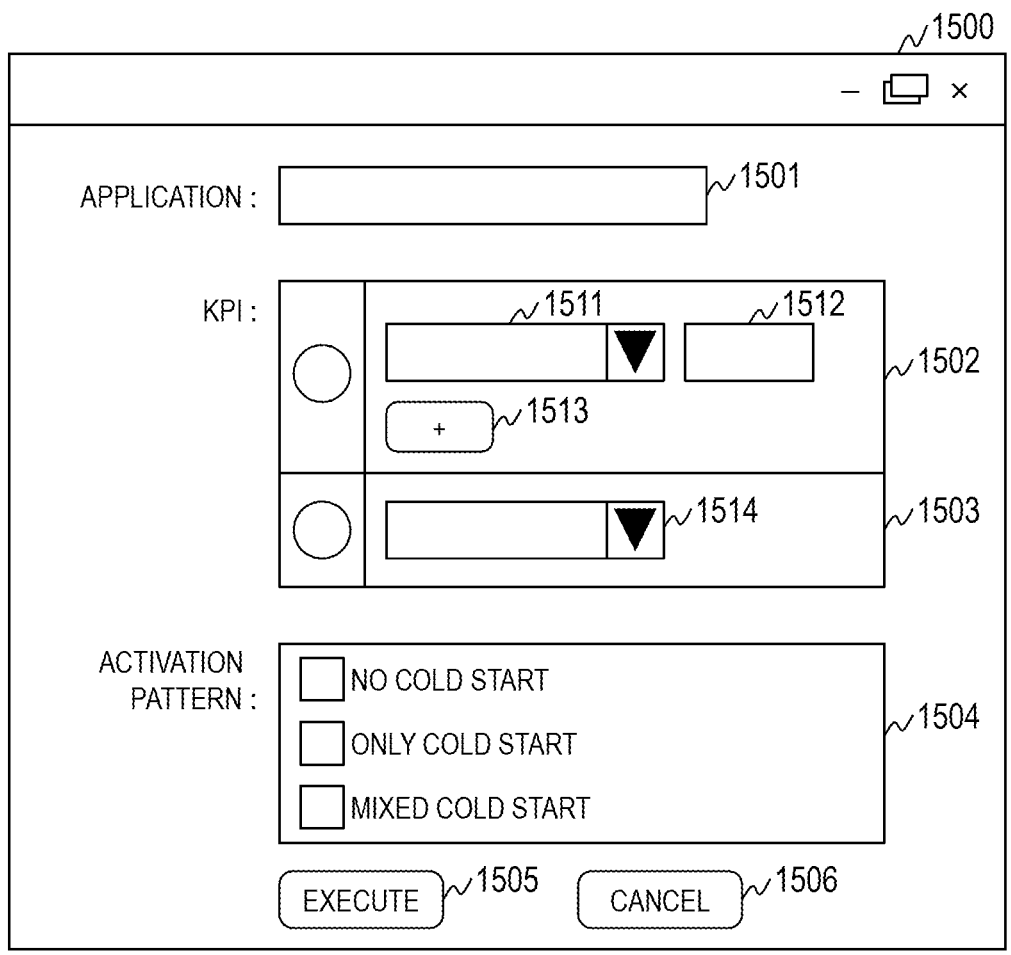
Figure 16:
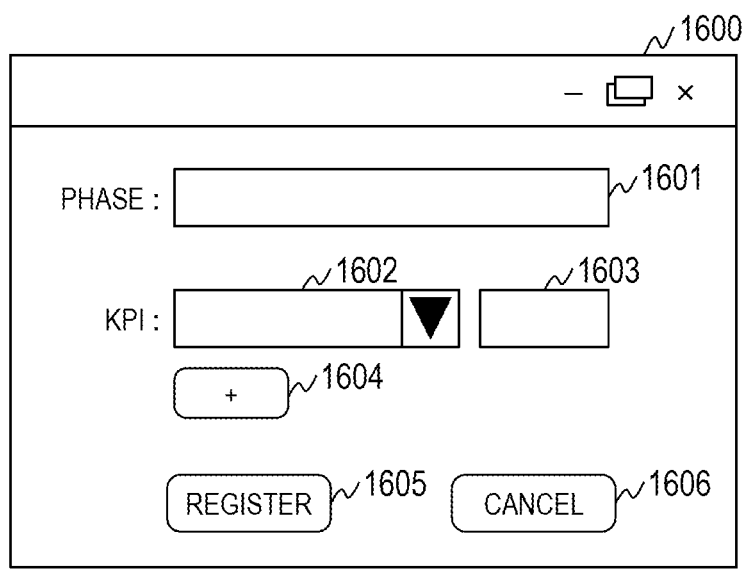

FIG. 14A and FIG. 14B are sequence diagrams for illustrating a flow of deployment processing for an application in the system of the first embodiment. FIG. 15, FIG. 16, and FIG. 17 are diagrams for illustrating examples of screens displayed on the client PC 101 in the first embodiment.

The client PC 101 operated by the user transmits an application list acquisition request to the application catalog management system 102 (Step S601).

In a case where the application catalog management system 102 receives the application list acquisition request, the application catalog management system 102 transmits the application list to the client PC 101 (Step S602). The application list includes information on the applications managed by the application catalog management system 102.

The user operating the client PC 101 refers to the application list, and selects the application to use. The client PC 101 operated by the user transmits an application acquisition request to the application catalog management system 102 in order to obtain the application selected by the user (Step S603).

In a case where the application catalog management system 102 receives the application acquisition request, the application catalog management system 102 transmits the application to the client PC 101 (Step S604).

The client PC 101 operated by the user transmits a deployment plan generation request to the deployment plan generation system 100 (Step S605). The deployment plan generation request includes information on the application. The deployment plan generation request may also include information to be used for narrowing down the deployment plan, for example, key performance indicators (KPIs).

The client PC 101 transmits the deployment plan generation request via a screen 1500 like that illustrated in FIG. 15, for example. The screen 1500 includes an input box 1501, a setting field 1502, a setting field 1503, a setting field 1504, an execute button 1505, and a cancel button 1506.

The input box 1501 is a box for inputting a file that is the actual substance of the application, for example.

The setting field 1502 and the setting field 1503 are fields for setting a KPI, which is an evaluation index of the deployment plan. In the first embodiment, at least one performance index is selected as a KPI. The user gives an input to any one of the setting field 1502 and the setting field 1503 by operating a radio button.

The setting field 1502 includes input boxes 1511 and 1512 and an add button 1513. The input box 1511 is a box for inputting the type of the KPI. The input box 1512 is a box for inputting the target value of the KPI. The add button 1513 is a button for adding input boxes 1511 and 1512.

The setting field 1503 includes an input box 1514. The input box 1514 is a box for inputting a phase. The phase represents the phase in which the application is deployed, and can be, for example, a test phase or a real phase. For example, the user sets the KPIs in advance for the phase by using a screen 1600 like that illustrated in FIG. 16.

The screen 1600 includes input boxes 1601, 1602, 1603, an add button 1604, a register button 1605, and a cancel button 1606.

The input box 1601 is a box for entering a name of the phase. The input boxes 1602 and 1603 are the same boxes as the input boxes 1511 and 1512. The add button 1604 is the same button as the add button 1513.

The register button 1605 is a button for registering the KPI settings for the phase. The cancel button 1606 is a button for canceling the operation.

Returning to the description of FIG. 15, the setting field 1504 is a field for setting a restriction of the activation pattern. The user can specify any one of an activation pattern for warm start only, an activation pattern for cold start only, or an activation pattern that mixes warm start and cold start. The setting field 1504 may also include a box for setting the number (threshold value) of instances to be activated in parallel.

The execute button 1505 is an operation button for transmitting the deployment plan generation request. The cancel button 1506 is a button for canceling the operation.

In a case where the deployment plan generation system 100 receives the deployment plan generation request, the deployment plan generation system 100 executes deployment plan generation processing (Step S606). The details of the deployment plan generation processing are described later.

The deployment plan generation system 100 transmits deployment plan display information to the client PC 101 as the result of the deployment plan generation processing (Step S607).

In a case where the client PC 101 receives the deployment plan display information, the client PC 101 displays a screen 1700 like that illustrated in FIG. 17. The screen 1700 includes a table 1701, a deploy button 1702, and a cancel button 1703.

The table 1701 is a table which displays the deployment plan. The table 1701 stores entries each including a selection 1711, an allocation pattern 1712, an activation pattern 1713, an activation timing 1714, a predicted processing time 1715, a predicted activation time 1716, a predicted cost 1717, and a predicted power consumption 1718. There is one entry for each deployment plan. The fields included in the entry are not limited to those described above. Any one of the fields described above may be excluded, or another field may be included.

The selection 1711 is a field which stores a box for selecting the deployment plan to be adopted. The allocation pattern 1712 is a field which stores combinations of environments of the deployment destination of the instance. The activation pattern 1713 is a field which stores combinations of activation types of the instance. The activation timing 1714 is a field which stores information on the activation timing of the instance.

The predicted processing time 1715, the predicted activation time 1716, the predicted cost 1717, and the predicted power consumption 1718 are the same fields as those of the predicted processing time 844, the predicted activation time 845, the predicted cost 846, and the predicted power consumption 847, respectively.

The deploy button 1702 is a button for transmitting the deployment request for the application. The cancel button 1703 is a button for canceling the operation.

The user refers to the table 1701, selects the deployment plan to be adopted, and operates the deploy button 1702. The client PC 101 transmits a deployment request including identification information on the selected deployment plan and the application to the deployment plan generation system 100 (Step S610).

In a case where the deployment plan generation system 100 receives the deployment request, the deployment plan generation system 100 transmits the deployment request including the information on the selected deployment plan and the application to the deployment control system 103 (Step S611). The deployment plan generation system 100 deletes, from the deployment plan DB 125, the information on the deployment plans that are not selected.

In a case where the deployment control system 103 receives the deployment request, the deployment control system 103 deploys the instance in the environment of the infrastructure system 104 (Step S612).

In a case where the deployment of the instance in the infrastructure system 104 is complete, the deployment control system 103 transmits a deployment completion notification to the client PC 101 (Step S613).

After the client PC 101 receives the deployment completion notification, the client PC 101 uses the application at a predetermined timing (Step S614).

Figure 18:
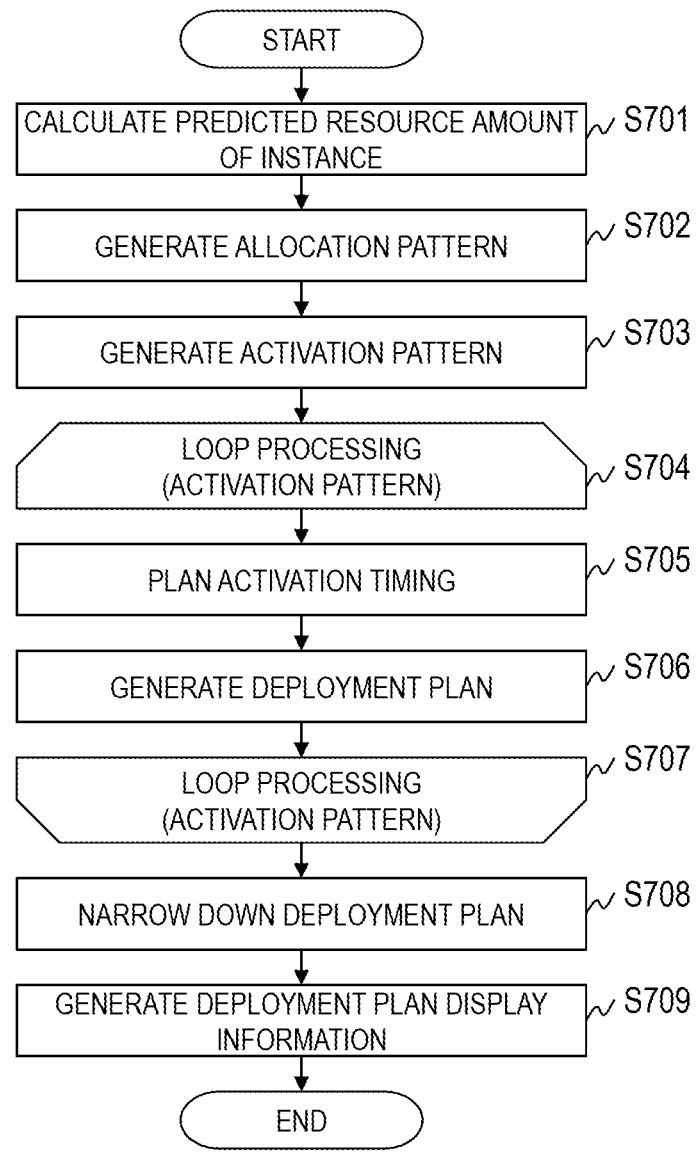
FIG. 18 is a flowchart for illustrating an example of deployment plan generation processing to be executed by the deployment plan generation system of the first embodiment.

FIG. 18 is a flowchart for illustrating an example of deployment plan generation processing to be executed by the deployment plan generation system 100 of the first embodiment.

First, the prediction module 112 uses the information on the application and the resource amount prediction model information 123 to calculate a predicted resource amount of the instance (Step S701). The prediction module 112 generates predicted resource amount information 800 based on the calculation result.

Next, the environment candidate search module 110 generates an allocation pattern of the instance based on the predicted resource amount of the instance and the infrastructure system operation management information 120 (Step S702).

Specifically, the following processing is executed.

(Step S702-1) The environment candidate search module 110 selects one instance.

(Step S702-2) The environment candidate search module 110 refers to the infrastructure system operation management information 120 to identify an environment (infrastructure system 104 and cluster) in which the predicted resource amount of the selected instance can be allocated. The environment candidate search module 110 stores data associating the instance with the identified environment in the work area.

(Step S702-3) The environment candidate search module 110 determines whether or not the processing is complete for all instances. In a case where the processing is not complete for all instances, the environment candidate search module 110 returns the process to Step S702-1.

(Step S702-4) In a case where the processing is complete for all instances, the environment candidate search module 110 generates an allocation pattern by combining the environment of each instance. The environment candidate search module 110 generates allocation pattern information 810 based on the result of generation.

The above is the description of the processing of Step S702.

Next, the environment candidate search module 110 generates an activation pattern of the instance (Step S703). Specifically, the following processing is executed.

(Step S703-1) The environment candidate search module 110 selects one instance.

(Step S703-2) The environment candidate search module 110 identifies the activation type based on the type of the selected instance. For example, in a case where the instance is a function, warm start and cold start are identified. The environment candidate search module 110 saves data associating the instance with the identified activation type in the work area.

(Step S703-3) The environment candidate search module 110 determines whether or not the processing is complete for all instances. In a case where the processing is not complete for all instances, the environment candidate search module 110 returns the process to Step S703-1.

(Step S703-4) In a case where the processing is complete for all instances, the environment candidate search module 110 generates an activation pattern by combining the activation type of each instance. The environment candidate search module 110 generates activation pattern information 820 based on the result of generation. At this time, the environment candidate search module 110 controls the generated activation pattern based on the information in the setting field 1504.

The above is the description of the processing of Step S703.

Next, the environment candidate search module 110 starts loop processing of the activation pattern (Step S704). Specifically, the environment candidate search module 110 selects one entry from the activation pattern information 820.

Next, the environment candidate search module 110 plans an activation timing for the activation pattern (Step S705).

For example, the environment candidate search module 110 plans the activation timing so as to maximize the number of instances to be activated in parallel. Further, in the case of specifying the number (threshold value) of instances to be activated in parallel, the environment candidate search module 110 plans the activation timing such that the number of instances to be activated in parallel is more than the threshold value. For example, in a case where the activation pattern includes three cold start instances and the threshold value is "1", an activation timing which activates three or two instances in parallel is planned. This enables the number of activation timings for which a plan is to be generated to be reduced. Therefore, the processing load can be reduced.

The environment candidate search module 110 registers a combination of the activation pattern and one activation timing in the activation timing information 830.

Next, the environment candidate search module 110 generates a deployment plan by combining the allocation pattern, the activation pattern, and the activation timing (Step S706). The environment candidate search module 110 registers the deployment plan in the deployment plan management information 840. At this time point, the predicted processing time 844, the predicted activation time 845, the predicted cost 846, and the predicted power consumption 847 are blank.

The environment candidate search module 110 determines whether or not the processing is complete for all activation patterns (Step S707).

In a case where the processing is not complete for all activation patterns, the environment candidate search module 110 returns the process to Step S704.

In a case where the processing is complete for all activation patterns, the environment candidate search module 110 narrows down the deployment plan (Step S708). Specifically, the following processing is executed.

(Step S708-1) The environment candidate search module 110 instructs the prediction module 112 to calculate the predicted value of the performance index for each deployment plan.

(Step S708-2) The prediction module 112 selects a deployment plan.

(Step S708-3) The prediction module 112 uses the information on the instance and the activation time prediction model information 124 to calculate the predicted activation time of each instance included in the deployment plan. The prediction module 112 also calculates the predicted processing time, the predicted cost, and the predicted power consumption based on the deployment plan. The predicted processing time can be calculated, for example, based on an execution history of the application. The predicted cost and the predicted power consumption can be calculated based on the environment of the deployment destination and the resource amount. The prediction module 112 sets the results of calculation in the predicted processing time 844, the predicted activation time 845, the predicted cost 846, and the predicted power consumption 847 of the entry corresponding to the deployment plan, and notifies the environment candidate search module 110 of the end of processing.

(Step S708-4) The environment candidate search module 110 deletes the deployment plans that do not satisfy the KPI from the deployment plan management information 840. For example, in a case where the processing time is specified as a KPI, the environment candidate search module 110 determines whether or not the KPI is satisfied based on the result of comparing the total value of the predicted processing time and the predicted activation time with the target value of the KPI.

The above is the description of the processing of Step S708.

Next, the environment candidate search module 110 generates deployment plan display information based on the deployment plan management information 840 (Step S709).

In a case where the application does not include a serverless instance, Step S703 to Step S707 are not executed. In this case, the allocation pattern is output as the deployment plan.

The environment candidate search module 110 may sort deployment plans based on the value of a KPI. In this case, in a case where there is no difference in the KPI between deployment plans with the same allocation pattern and activation pattern but a different activation timing (number of instances to be activated in parallel), the environment candidate search module 110 may preferentially display the deployment plan having a smaller number of instances to be activated in parallel.

The environment candidate search module 110 in the first embodiment can not only plan combinations of environments in which the instance is to be deployed, but can at the same time also plan activation patterns and activation timings of the instance in the environment. With this configuration, it is possible to present a deployment plan that considers the activation method for a serverless instance.

Figures 19, 20:
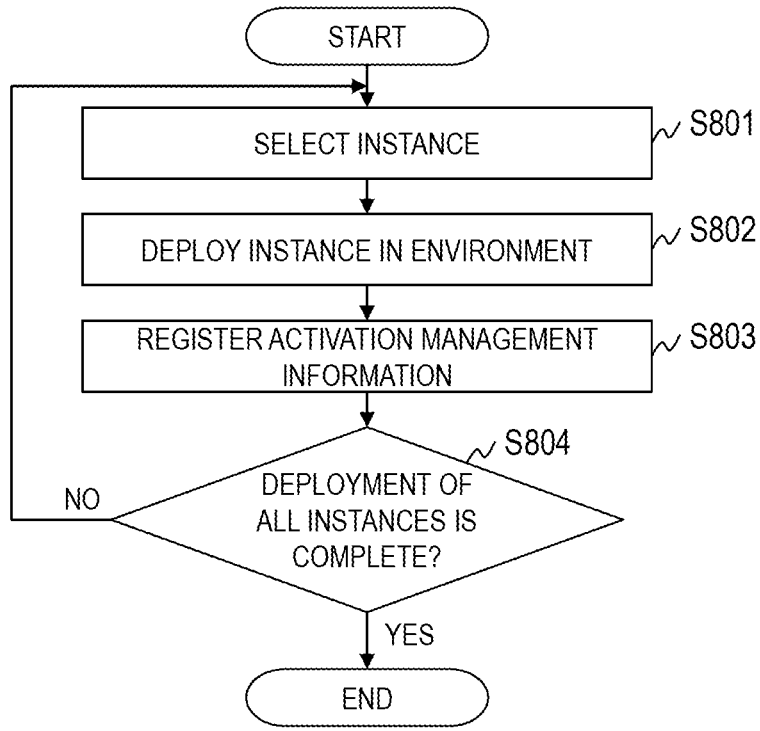
FIG. 19 is a flowchart for illustrating an example of deployment processing to be executed by a deployment control system of the first embodiment.
FIG. 20 is a table for showing an example of activation management information transmitted by the deployment control system of the first embodiment.

FIG. 19 is a flowchart for illustrating an example of deployment processing to be executed by the deployment control system 103 of the first embodiment. FIG. 20 is a table for showing an example of activation management information 2000 transmitted by the deployment control system 103 of the first embodiment.

The deployment control system 103 selects one instance to be deployed based on the deployment plan (Step S801).

The deployment control system 103 deploys the instance in the environment of a predetermined infrastructure system 104 based on the deployment plan (Step S802).

The deployment control system 103 registers the activation management information 2000 in the infrastructure system 104 in which the instance has been deployed (Step S803).

The activation management information 2000 is generated based on the activation pattern and the activation timing included in the deployment plan. The activation management information 2000 stores entries each including an application ID 2001, an instance ID 2002, and an activation timing 2003. One entry corresponds to one instance.

The application ID 2001 and the instance ID 2002 are the same fields as those of the application ID 401 and the instance ID 402, respectively. The activation timing 2003 is a field which stores information on the activation timing of the instance. The activation timing 2003 of a warm-start instance is blank.

The deployment control system 103 may register information defining the execution flow of the instance together with the activation management information 2000.

The deployment control system 103 determines whether or not the deployment of all instances is complete (Step S804). In a case where the deployment of all instances is not complete, the deployment control system 103 returns the process to Step S801.

In a case where the deployment of all instances is complete, the deployment control system 103 ends the deployment processing.

The activation management information 2000 may be registered only in the infrastructure system 104 in which the instance relating to the activation timing is deployed.

Figure 21:
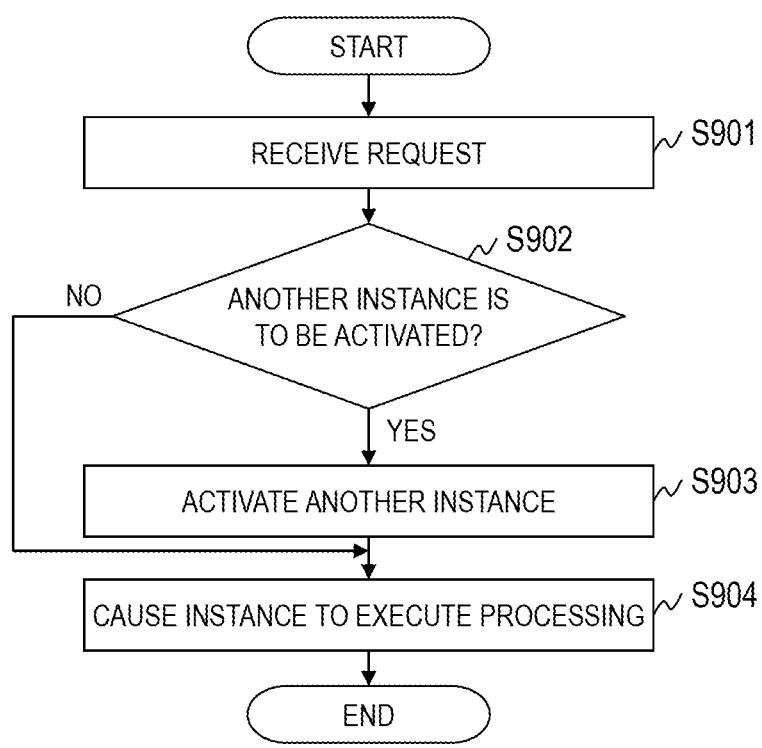
FIG. 21 is a flowchart for illustrating an example of application call processing to be executed by an infrastructure system in the first embodiment.

FIG. 21 is a flowchart for illustrating an example of application call processing to be executed by the infrastructure system 104 in the first embodiment.

In a case where the infrastructure system 104 receives a request for an instance (Step S901), the infrastructure system 104 refers to the activation management information 2000, and determines whether or not it is required to activate another instance (Step S902). Specifically, the infrastructure system 104 determines whether or not there is an instance to be activated in a case where a request for an instance is received.

In a case where it is not required to activate another instance, the infrastructure system 104 advances the process to Step S904.

In a case where it is required to activate another instance, the infrastructure system 104 activates the another instance based on the activation management information 2000 (Step S903). The infrastructure system 104 then advances the process to Step S904. For example, in a case where the another instance is to be deployed in the environment of the infrastructure system 104 itself, the infrastructure system 104 allocates resources to the another instance and activates the another instance. In a case where the another instance is to be deployed in the environment of another infrastructure system 104, the infrastructure system 104 instructs the another infrastructure system 104 to activate the instance.

In Step S904, the infrastructure system 104 causes the instance to process the received request (Step S904).

Through registration of the activation management information 2000 in the infrastructure system 104 when an instance is deployed, the activation of the instance can be automated.

As described above, the deployment plan generation system 100 of the first embodiment can plan and present a deployment plan that considers the activation method for a serverless instance.

Second Embodiment

In a second embodiment of this invention, description is given of a system that redeploys an instance. The second embodiment is described below by focusing on the differences from the first embodiment.

Figure 22:
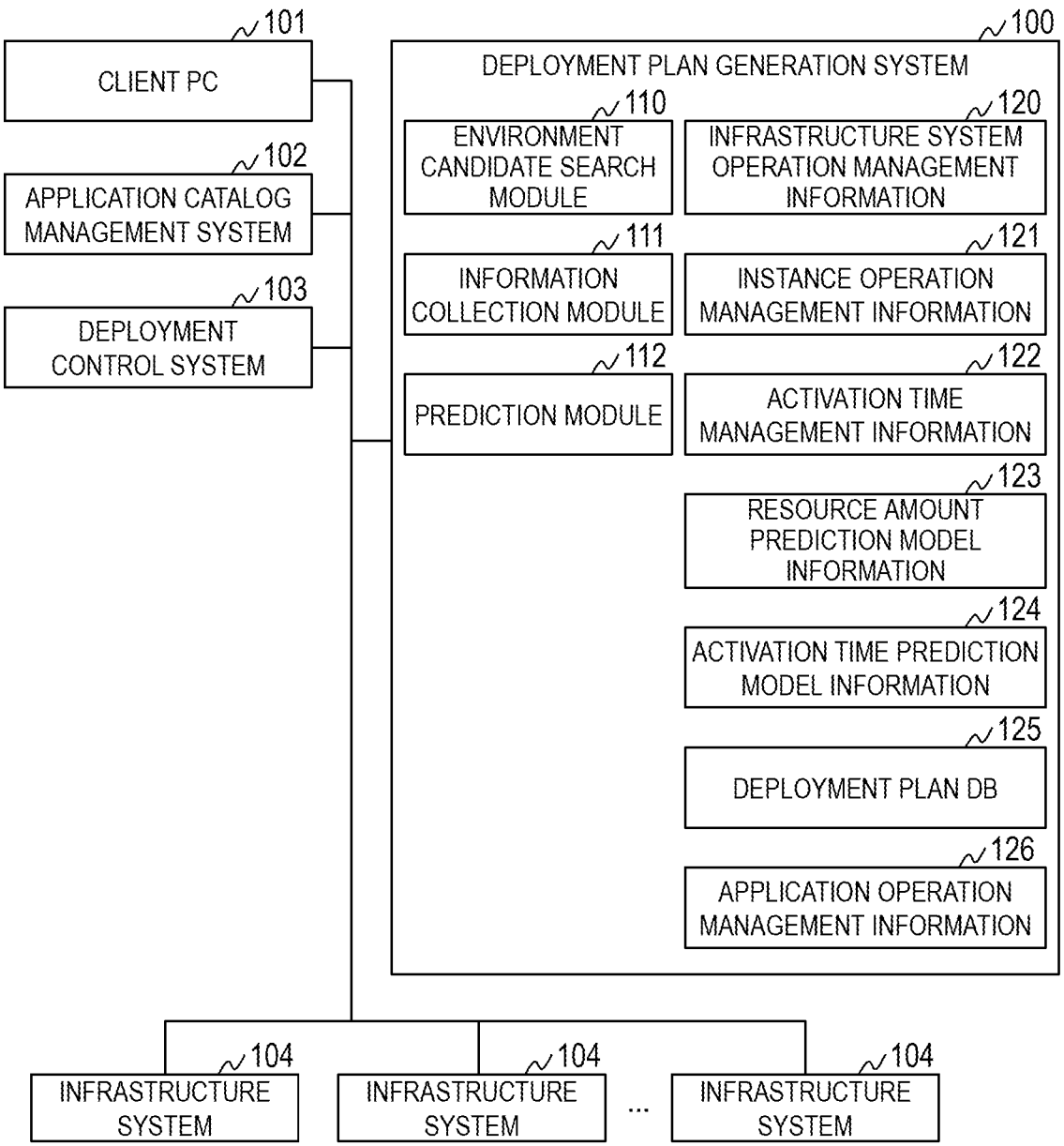
FIG. 22 is a diagram for illustrating an example of a configuration of a system according to a second embodiment.

FIG. 22 is a diagram for illustrating an example of a configuration of a system according to the second embodiment.

The configuration of the system of the second embodiment is the same as that of the first embodiment. In the second embodiment, the configuration of the deployment plan generation system 100 is partially different. The deployment plan generation system 100 of the second embodiment holds application operation management information 126.

FIG. 23 is a table for showing an example of the application operation management information 126 in the second embodiment.

The application operation management information 126 is information for managing the operating status of the application. The application operation management information 126 stores entries each including an application ID 2301, an allocation pattern 2302, an activation pattern 2303, an activation timing 2304, a processing time 2305, a cost 2306, and a power consumption 2307. There is one entry for each application. The fields included in the entry are not limited to those described above. Any one of the fields described above may be excluded, or another field may be included.

The application ID 2301 is the same field as that of the application ID 401.

The allocation pattern 2302 is a field which stores the allocation pattern of the instance. The activation pattern 2303 is a field which stores the activation pattern of the instance. The activation timing 2304 is a field which stores information on the activation timing of the instance.

The processing time 2305 is a field which stores the processing time of the application. The cost 2306 is a field which stores the cost required to operate the application. The power consumption 2307 is a field which stores the power consumption due to operation of the application.

The processing of updating the information (infrastructure system operation management information 120, instance operation management information 121, activation time management information 122, resource amount prediction model information 123, and activation time prediction model information 124) to be executed by the deployment plan generation system 100 of the second embodiment is the same as that in the first embodiment. The flow of the application deployment processing in the second embodiment is the same as that in the first embodiment. However, in the second embodiment, the deployment plan generation system 100 adds an entry to the application operation management information 126 in a case where a deployment request is received from the client PC 101 (Step S610). The deployment plan generation system 100 sets the values in the application ID 2310, the allocation pattern 2302, the activation pattern 2303, and the activation timing 2304 of the added entry based on the selected deployment plan.

The deployment plan generation processing to be executed by the deployment plan generation system 100 of the second embodiment is the same as that in the first embodiment. The deployment processing to be executed by the deployment control system 103 of the second embodiment is the same as that in the first embodiment. The application call processing to be executed by the infrastructure system 104 in the second embodiment is the same as that in the first embodiment.

In the second embodiment, the information collection module 111 of the deployment plan generation system 100 obtains operation information on the application from the infrastructure system 104, and updates the application operation management information 126 based on the obtained information.

Figure 24:
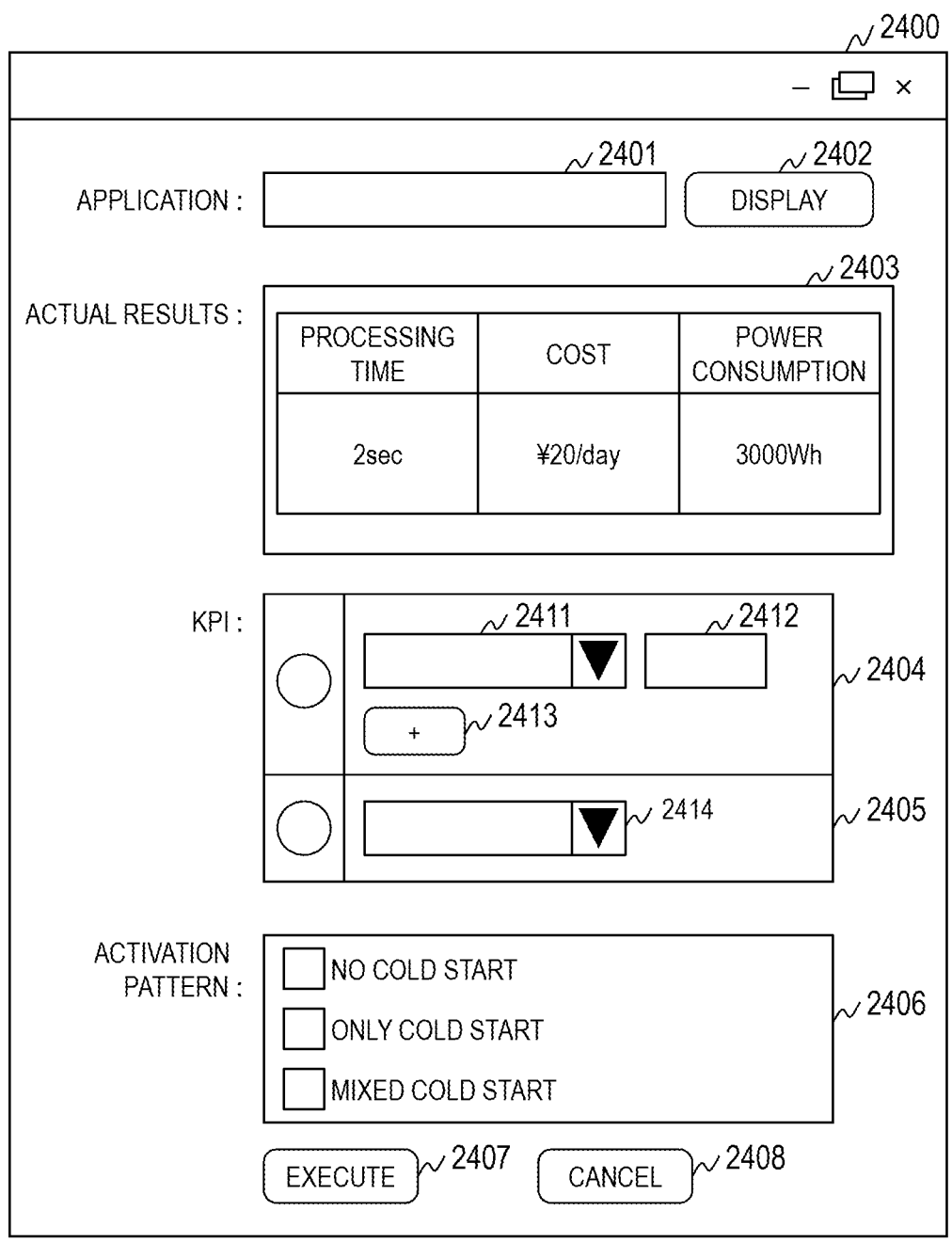
FIG. 24 is diagrams for illustrating examples of screens displayed on the client PC in the second embodiment.

In the second embodiment, the client PC 101 transmits a redeployment request to the deployment plan generation system 100 at a certain timing. In this case, the deployment plan generation system 100 displays a screen like that illustrated in FIG. 24 on the client PC 101.

The screen 2400 includes an input box 2401, a display button 2402, a display field 2403, a setting field 2404, a setting field 2405, a setting field 2406, an execute button 2407, and a cancel button 2408.

The setting field 2404, the setting field 2405, the setting field 2406, the execute button 2407, and the cancel button 2408 are the same as the setting field 1502, the setting field 1503, the setting field 1504, the execute button 1505, and the cancel button 1506, respectively.

The input box 2401 is a box for inputting the ID of the application, for example. The display button 2402 is a button for displaying the operating status of the application. The display field 2403 is a field for displaying operation information on the application.

In a case where the display button 2402 is operated, the deployment plan generation system 100 obtains the operation information on the specified application from the application operation management information 126, and transmits the obtained operation information to the client PC 101. The client PC 101 displays the received application operation information in the display field 2403.

In a case where the execute button 2407 is operated, the deployment plan generation system 100 executes deployment plan generation processing. At this time, the deployment plan adopted the previous time is excluded from the displayed deployment plans.

According to the second embodiment, the user can review the deployment plan in a case where the operating status of the application deviates significantly from the predicted operating status.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising at least one computer, the at least one computer including a processor, a storage device coupled to the processor, and a network interface coupled to the processor,
   the computer system being coupled to a plurality of infrastructure systems each configured to implement an environment for providing resources to each of a plurality of instances forming an application which executes processing,
   the processor being configured to:
   receive a deployment plan generation request for the application which includes at least one serverless instance for which, as an activation method, any one of a warm start and a cold start is selectable, the warm start being allocating and activating resources at a time of deployment, the cold start being allocating and activating resources when an execution trigger is detected;
   generate, based on a resource amount required for each of the plurality of instances, an allocation pattern which is a combination of an environment of a deployment destination of each of the plurality of instances;
   generate an activation pattern which is a combination of the activation method for each of the plurality of instances;
   plan an activation timing of the at least one serverless instance for the activation pattern;
   generate a plurality of deployment plans by combining the allocation pattern, the activation pattern, and the activation timing; and
   generate display information for displaying the plurality of deployment plans.

2. The computer system according to claim 1,
   wherein the deployment plan generation request includes information on a restriction of the activation pattern, and
   wherein the processor is configured to generate the activation pattern based on the information on the restriction of the activation pattern.

3. The computer system according to claim 2,
   wherein the application includes a plurality of serverless instances,
   wherein the deployment plan generation request includes a threshold value of the number of serverless instances adopting the cold start to be activated in parallel, and
   wherein the processor is configured to plan the activation timing such that the number of serverless instances adopting the cold start to be activated in parallel is more than the threshold value.

4. The computer system according to claim 1,
   wherein the deployment plan generation request includes a target value of an evaluation index for evaluating each of the plurality of deployment plans, and
   wherein the processor is configured to:
   calculate a value of the evaluation index of each of the plurality of deployment plans; and
   select at least one deployment plan to be presented based on a result of comparison between the value of the evaluation index of each of the plurality of deployment plans and the target value.

5. A deployment plan generation method for a plurality of instances forming an application which executes processing, the deployment plan generation method being executed by a computer system,
   the computer system including at least one computer, the at least one computer including a processor, a storage device coupled to the processor, and a network interface coupled to the processor,
   the computer system being coupled to a plurality of infrastructure systems each configured to implement an environment for providing resources to each of the plurality of instances,
   the deployment plan generation method including:
   a first step of receiving, by the at least one computer, a deployment plan generation request for the application which includes at least one serverless instance for which, as an activation method, any one of a warm start and a cold start is selectable, the warm start being allocating and activating resources at a time of deployment, the cold start being allocating and activating resources when an execution trigger is detected;
   a second step of generating, by the at least one computer, based on a resource amount required for each of the plurality of instances, an allocation pattern which is a combination of an environment of a deployment destination of each of the plurality of instances;
   a third step of generating, by the at least one computer, an activation pattern which is a combination of the activation method for each of the plurality of instances;
   a fourth step of planning, by the at least one computer, an activation timing of the at least one serverless instance for the activation pattern;
   a fifth step of generating, by the at least one computer, a plurality of deployment plans by combining the allocation pattern, the activation pattern, and the activation timing; and
   a sixth step of generating, by the at least one computer, display information for displaying the plurality of deployment plans.

6. The deployment plan generation method according to claim 5,
wherein the deployment plan generation request includes information on a restriction of the activation pattern, and
wherein the third step includes generating, by the at least one computer, the activation pattern based on the information on the restriction of the activation pattern.

7. The deployment plan generation method according to claim 6,
wherein the application includes a plurality of serverless instances,
wherein the deployment plan generation request includes a threshold value of the number of serverless instances adopting the cold start to be activated in parallel, and
wherein the fifth step includes planning, by the at least one computer, the activation timing such that the number of serverless instances adopting the cold start to be activated in parallel is more than the threshold value.

8. The deployment plan generation method according to claim 5,
wherein the deployment plan generation request includes a target value of an evaluation index for evaluating each of the plurality of deployment plans, and
wherein the sixth step includes:
calculating, by the at least one computer, a value of the evaluation index of each of the plurality of deployment plans; and
selecting, by the at least one computer, at least one deployment plan to be presented based on a result of comparison between the value of the evaluation index of each of the plurality of deployment plans and the target value.

9. A deployment control system for controlling deployment of a plurality of instances forming an application which executes processing, the deployment control system comprising a processor, a storage device coupled to the processor, and a network interface coupled to the processor,
the deployment control system being coupled to a plurality of infrastructure systems each configured to implement an environment for providing resources to each of the plurality of instances, and to the computer system of claim 1,
the deployment control system being configured to:
receive a deployment request including one of the plurality of deployment plans from the computer system;
generate activation management information for controlling the activation of the serverless instance based on the one of the plurality of deployment plans; and
deploy each of the plurality of instances in the infrastructure system and set the activation management information.

\* \* \* \* \*